United States Patent [19]
Kraft

[11] Patent Number: 5,864,922
[45] Date of Patent: Feb. 2, 1999

[54] SELF CENTERING HINGE

[75] Inventor: Kurt R. Kraft, Normandy Park, Wash.

[73] Assignee: The Boeing Company, Seattle, Wash.

[21] Appl. No.: 694,009

[22] Filed: Aug. 8, 1996

[51] Int. Cl.[6] .............................. E05D 7/10; E05D 7/06
[52] U.S. Cl. ............................................ 16/266; 16/239
[58] Field of Search .......................... 16/266, 265, 380, 16/239, 235, 241, 247, 248, 243, 221

[56] References Cited

U.S. PATENT DOCUMENTS

| | | | |
|---|---|---|---|
| 1,132,601 | 3/1915 | Moynihan | 16/266 |
| 2,052,465 | 8/1936 | Hardy, Jr. | 16/266 |
| 2,775,478 | 12/1956 | Stimetz et al. | |
| 2,810,152 | 10/1957 | Bruno | 16/153 |
| 3,113,353 | 12/1963 | Tucknott | 20/16 |
| 4,334,338 | 6/1982 | Conn | 16/266 |
| 4,365,775 | 12/1982 | Glancy | 244/53 |
| 4,524,485 | 6/1985 | Harris | 16/364 |
| 4,584,739 | 4/1986 | Konen | 16/266 |
| 5,050,344 | 9/1991 | Skeem | 49/237 |
| 5,072,898 | 12/1991 | Amelio | 244/129 |
| 5,203,525 | 4/1993 | Remlaoui | 244/129 |
| 5,406,748 | 4/1995 | Davlantes | 49/169 |
| 5,669,106 | 9/1997 | Daoud | 16/266 |

*Primary Examiner*—Chuck Y. Mah
*Attorney, Agent, or Firm*—Robert H. Sproule

[57] ABSTRACT

A hinge (50) for a panel (26) allows movement of the panel (26) between a closed position inside a framed opening and an open position away from the opening. In an exemplary embodiment, the hinge (50) is used to attach a fan cowl panel (26) to a jet engine (20). To prevent loading the hinge (56) in an axial direction when the panel (26) is in the closed position, the panel (26) is movable axially along the hinge line (66). In the past this has resulted in the fan cowl panel (26) being misaligned during closure between the inlet cowl panel (22) and the thrust reverser cowl panel (24) resulting in damage to the fan cowl panel (26) and surrounding structure. The hinge (50) of the present invention automatically aligns a V-blade (38) of the fan cowl panel (26) with a V-groove (40) of the inlet cowl panel (22) during closure of the fan cowl panel (56) in order to overcome this misalignment problem.

4 Claims, 6 Drawing Sheets

SELF CENTERING HINGE

TECHNICAL FIELD

The present invention relates to a self centering hinge, and more particularly to a panel hinge which automatically pivots to a centered position for closing of the panel.

BACKGROUND OF THE INVENTION

The function of a hinge is typically to support a door, gate, panel or similar device for pivoting movement between a closed position inside a framed opening and an open position outside the opening. The hinge is typically designed so that the panel is movable only about the pivot axis of the hinge. Therefore, when the panel is moved to the closed position, it is usually aligned within the framed opening.

Sometimes, it is desirable to permit the panel to move axially along the hinge axis as well as to pivot about the hinge axis. This can create problems when the panel is moved to the closed position and the panel is not aligned with the framed opening. For example, such misalignment can prevent the panel from closing properly. In addition, any overlap between the panel and the frame can result in damage to these components when they contact each other during closing.

Figure 1:
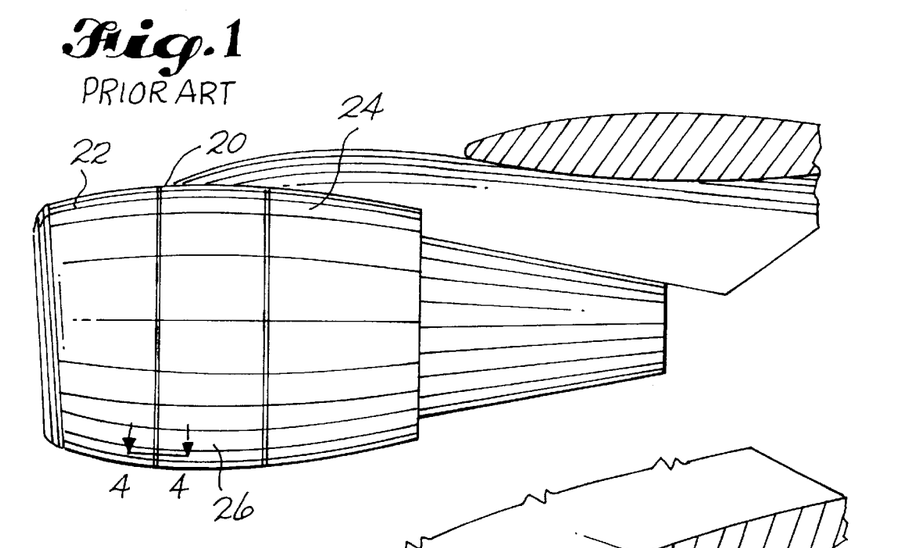
FIG. 1 is a side view of a conventional airplane jet engine.

A situation where it is desirable for the panel to be movable axially along the hinge line involves the cowl panels on an aircraft jet engine. Referring to FIG. 1 of the drawings, there is shown a conventional aircraft jet engine indicated at 20 having inlet cowl 22 at the forward end of the engine, a pair of opposing curved, C-shaped thrust reverser panels 24 (only one of which is shown) at the rear end, and a pair of fan cowl panels 26 (only one of which is shown) positioned intermediate between the inlet cowl 22 and the thrust reverser panels 24.

Figure 2:
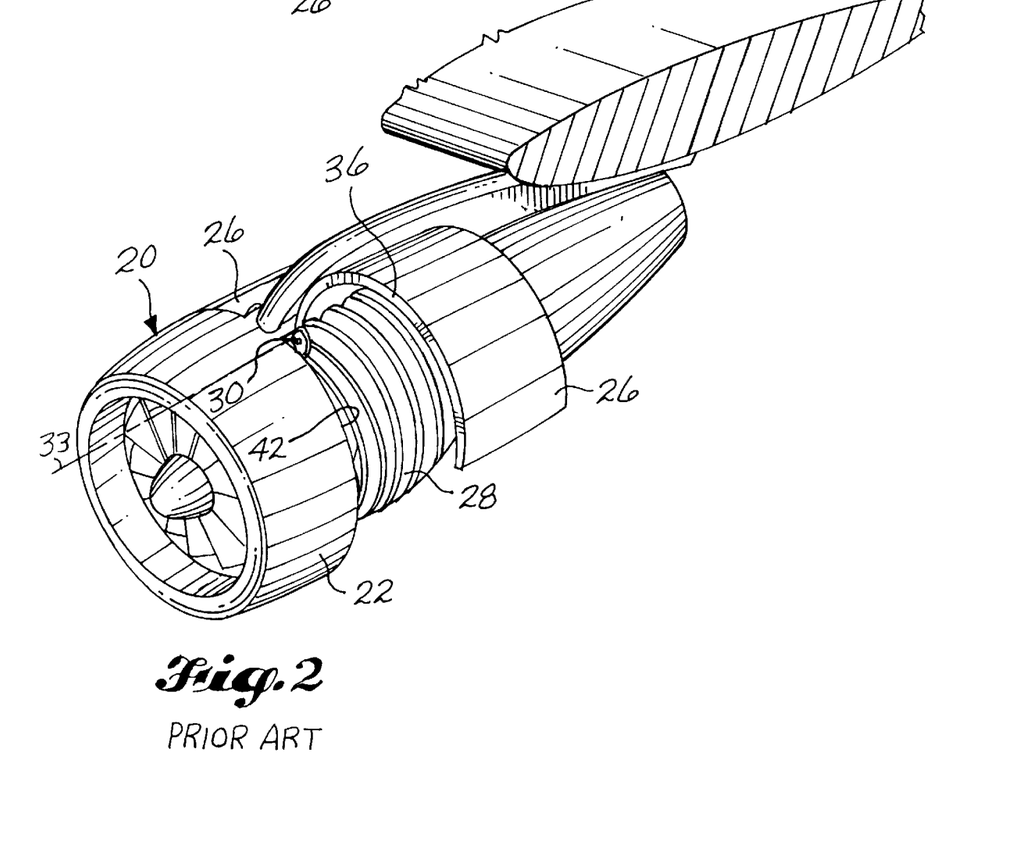
FIG. 2 is an isometric view of a conventional airplane jet engine having the port fan cowl panel in the open position.
Figure 3:
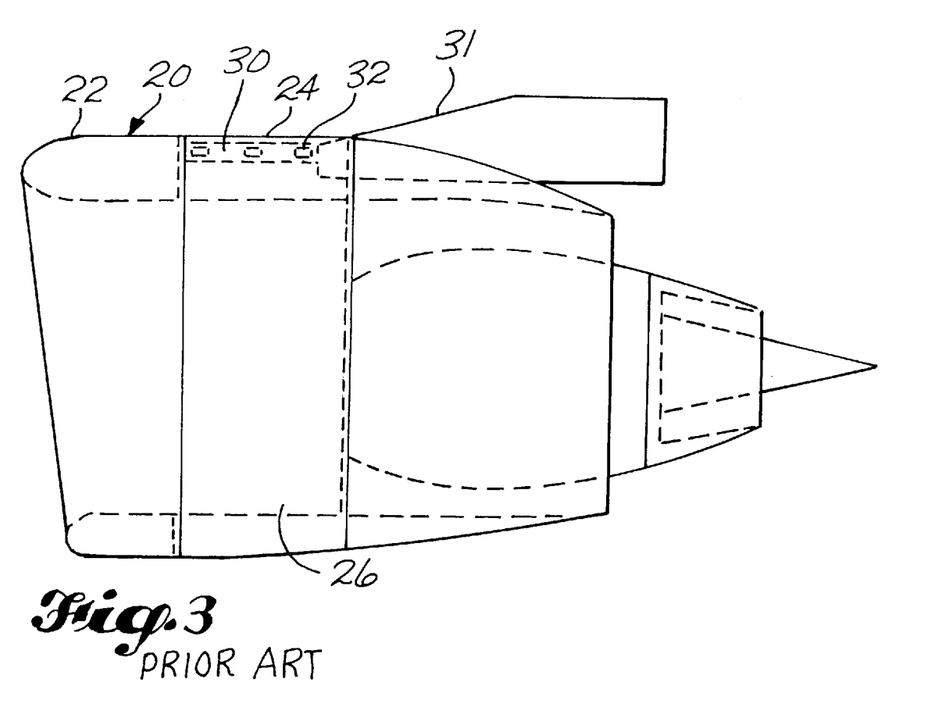
FIG. 3 is side view of a conventional airplane jet engine showing certain components inside the engine in hidden lines.

In order to provide access for mechanics to an engine 28 located behind the panels, both fan cowl panels 26 are movable between a closed position shown in FIG. 1 and an open position shown in FIG. 2 where only the port fan cowl panel is shown open. As shown in FIG. 3, the fan cowl panel 26 is connected to a forward extending beam 30 of a strut 31 by three (forward, middle and aft) upper hinges 32 which allow the bottom of the panel 26 to be moved upward and outward from the engine 28 as shown in FIG. 2.

In conventional hinge design for engine cowl panels, the fan cowl panel 26 is free to move in a fore and aft direction along an axial hinge line designated by a line numbered 33 in FIG. 2. More particularly, each hinge 30 has a longer axial dimension than the width of the fitting (not shown) which attaches the panel 26 to the hinge 30. This allows the panel 26 to have a limited amount of movement in the fore and aft direction (relative to the engine) along the hinge axis 33.

The purpose of designing the hinge 32 to allow such axial freedom of movement is to prevent reacting certain flight loads to the hinge. More specifically, during flight when the fan cowl 26 is in the closed position, it is joined with the inlet cowl by a conventional blade and groove arrangement indicated at 34 in FIG. 4. That is, a forward edge portion 36 of the fan cowl 26 includes an annular blade (known as a "V-blade") 38 which projects inward from the inner surface of the fan cowl 26 and which extends vertically between the top and bottom of the fan cowl. When the fan cowl 26 is in the closed position, the blade 38 fits inside an annular groove 40 (known as a "V-groove") which extends vertically between the top and bottom of the inlet cowl 22 at a rear edge portion 42 of the inlet cowl.

Because there can be significant relative motion between the engine 28 and the inlet cowl 22 (with the fan cowl 26 firmly attached thereto), the fan cowl hinges 32 take both vertical and side loads, but do not take loads in the axial direction. That is, certain loads are transmitted axially to the fan cowl 26 from the inlet cowl 22. To avoid reacting these loads at the fan cowl hinges 26 and thereby avoiding possible damage to these hinges, the fan cowl hinges are designed as discussed above to permit movement of the fan cowl panels 26 relative to the strut 31 in an axial direction along the fan cowl hinges 32.

Although the aforementioned conventional design avoids unwanted loading of the fan cowl hinges 32 in the axial direction, it results in problems during the closing of the fan cowls 26 after completing ground maintenance on the engine. During the maintenance activity, it is possible for the fan cowl panel 26 to be pushed up against the forward or rear portions of the hinge fitting thereby causing misalignment.

Figure 4:
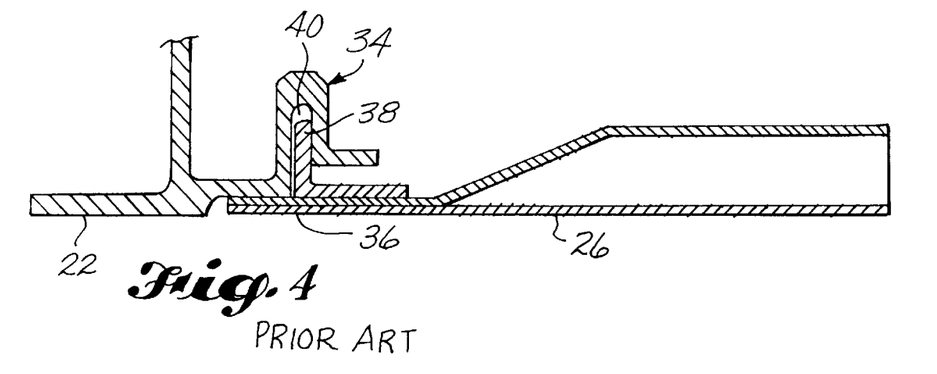
FIG. 4 is a sectional view taken along line 4—4 of FIG. 1 and showing a conventional V-blade and V-groove arrangement.

More specifically, during closure it is difficult to properly align the fan cowl panels 26 between the inlet cowl 22 and the thrust reverser panels 24 so that the V-blade 38 is aligned with the V-groove 40 (FIG. 4). Moreover, these panels are quite large, can be difficult to maneuver, and provide a broad area which is subject to being blown and buffeted by wind. Furthermore, it is difficult for the maintenance personnel who are positioned below the engine, to determine whether the fan cowl panel 26 is properly aligned so that the V-groove blade 38 is aligned with the V-groove 40 at the top part of the engine during the initial portion of the closing sequence.

A typical problem during the initial part of the closing sequence occurs at the upper part of the engine when the forward edge 36 (FIG. 2) of the fan cowl panel 26 overlaps a rearward edge 42 of the inlet cowl so that the V-groove blade 38 is misaligned with the V-groove 40. When the mechanic closes the fan cowl panel, the V-blade 38 either misses the V-groove 40 entirely (fan cowl 26 fully aft) or the segment of the V-blade 38 nearest the hinge 30 contacts the inlet cowl structure forward of the V-groove 40. This can cause significant damage to the fan cowl and surrounding structure. In most of these instances, the mechanic is unaware that damage is occurring because the area of damage is out of view (on top of the engine) where there are large leverage forces at the misaligned contact points.

SUMMARY OF THE INVENTION

The present invention pertains to a hinge assembly for supporting a workpiece, relative to a reference member, from a support member. The hinge assembly includes means, connected to the support member, for supporting the workpiece. The hinge assembly operates in a manner to allow pivotal movement of the workpiece about a pivot axis of the workpiece supporting means between a first position and a second position. When the workpiece is in the first position the workpiece is allowed to move in an axial direction relative to the pivot axis, and when the workpiece is in the second position the workpiece is not allowed to move in the axial direction. In addition, the hinge assembly includes means, attached to the workpiece supporting means, for aligning the workpiece with the reference member during movement of the panel to the first position.

In an exemplary embodiment, the workpiece aligning means includes (1) guide means, such as a centering lug, and (2) means, such as a first location of a clevis fitting, for engaging the guide means at the first location of the clevis fitting to prevent axial movement of the guide means along the pivot axis so as to align the workpiece with the reference member, and (3) means, such as a second location of the clevis fitting, for engaging the guide means at the second location to allow axial movement of the guide means along the pivot axis.

In the present invention, the alignment means is an integral part of the hinge. This is unlike conventional alignment guides which are separate from the hinge. Thus, the present alignment means is lighter in weight and less complex than conventional mechanisms.

BRIEF DESCRIPTION OF THE DRAWINGS

These and other advantages and benefits of the present invention will be discussed in the following detailed description in conjunction with the attached drawings, in which.

DETAILED DESCRIPTION FOR CARRYING OUT THE INVENTION

Figure 5:
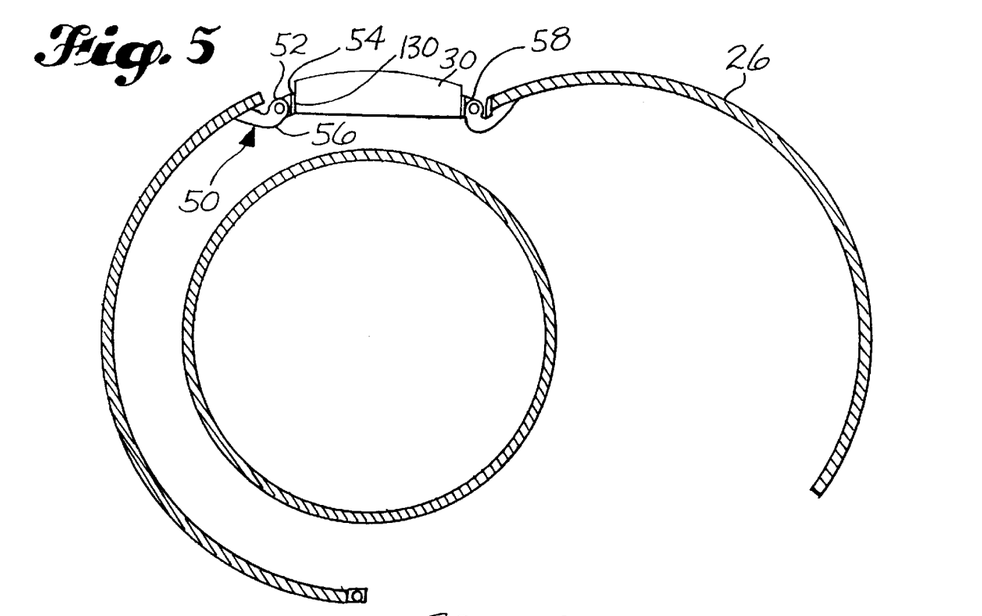
FIG. 5 is a front cross-sectional view showing the starboard fan cowl panel in a closed position and the port fan cowl panel in an open position.

Referring first to FIG. 5 there is shown the conventional fan cowl panels 26, each of which is connected to the strut 30 by three novel hinges indicated at 50 (only one of which is shown per fan cowl 26) of the present invention. As shown in FIG. 5, each hinge 50 includes (i) a mounting assembly 52 which is connected to a side 54 of the strut, and an (ii) arm 56 which is pivotally connected at one end to the mounting assembly 52 and which is rigidly connected at its opposite end to the fan cowl panel 26.

Figure 6:
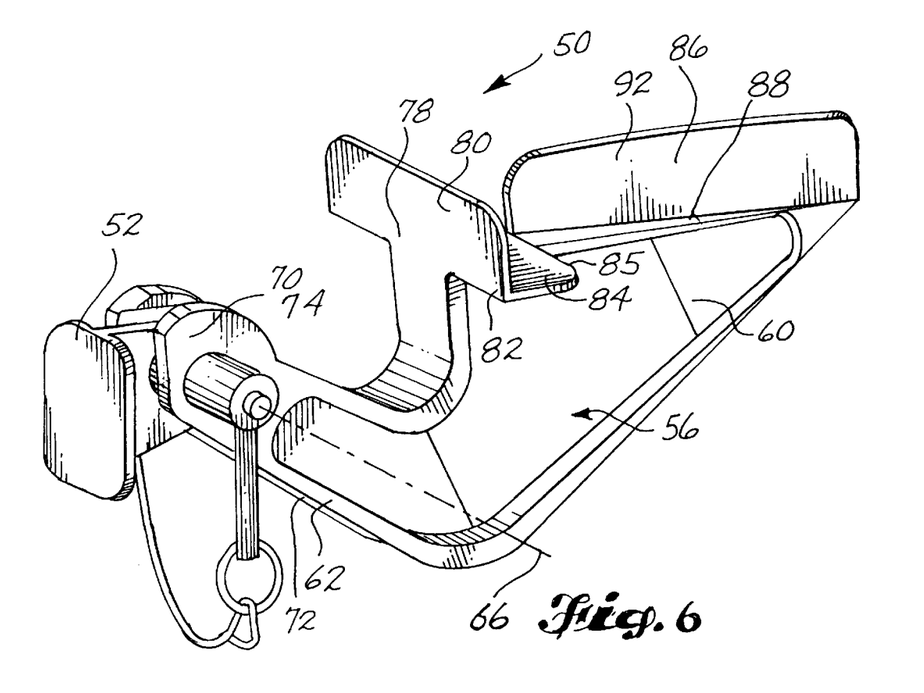
FIG. 6 is an isometric view of the exemplary hinge in a closed position.

As shown in FIG. 6, the hinge arm 56 has an outboard portion 60 which is configured for attachment to the fan cowl panel 26 and an inboard portion 62 which is configured for pivotal connection to the mounting assembly 52 about a pivot axis designated by a dashed line identified by the number 66. The arm 56 has a narrow, flange-like configuration which occupies a vertical plane (when viewing FIG. 6) and has a main lengthwise axis which is perpendicular to the hinge axis 66.

The inboard portion 62 of the arm 56 extends in an upward and inboard direction and terminates at a pivot connector assembly 70 to be discussed in more detail later. The arm inboard portion 62 is defined by (i) an inboard flat surface 72 which extends in an upward and inboard direction terminating at the pivot connector assembly 70, and (ii) an outboard concave surface 74 which extends in a downward and outboard direction from the pivot connector assembly 70 and then upward and further outboard where it terminates at a longeron attachment fitting 78.

The longeron attachment fitting 78 is so named because its function is to attach a longeron portion of the fan cowl panel 26 to the arm 56 in a manner to be discussed later. As shown in FIG. 6, the longeron attachment fitting 78 forms part of the outboard portion 60 of the arm 56 and includes a vertical wall segment 80 which joins at a lower corner 82 with a floor segment 84. The floor segment 84 slopes slightly downward in the outboard direction terminating at an edge 85. The floor segment 84 has a long lengthwise dimension which is parallel to the pivot axis 66 and a short width dimension which extends in the outboard direction along the main axis of the arm 56.

The outboard portion 60 of the hinge also includes a leg attachment fitting 86 which is used to attach to a leg portion of the fan cowl panel 26 to the arm 56 in a manner to be discussed later. The leg attachment fitting 86 includes a floor segment 88 which extends downward and outboard from the edge 85 of the longeron floor segment 84 defining a long lengthwise dimension which extends in the outboard direction along the main axis of the arm 56. The leg floor 88 has a narrow width dimension which is parallel to the hinge axis 66. Furthermore, extending in both a lengthwise direction as well as vertically upward from the center of the leg floor segment 88 in a direction perpendicular to the longeron wall segment 80 is a vertical wall segment 92 which slopes in a direction downward and outboard with the floor segment 88.

Figures 7, 8, 9:
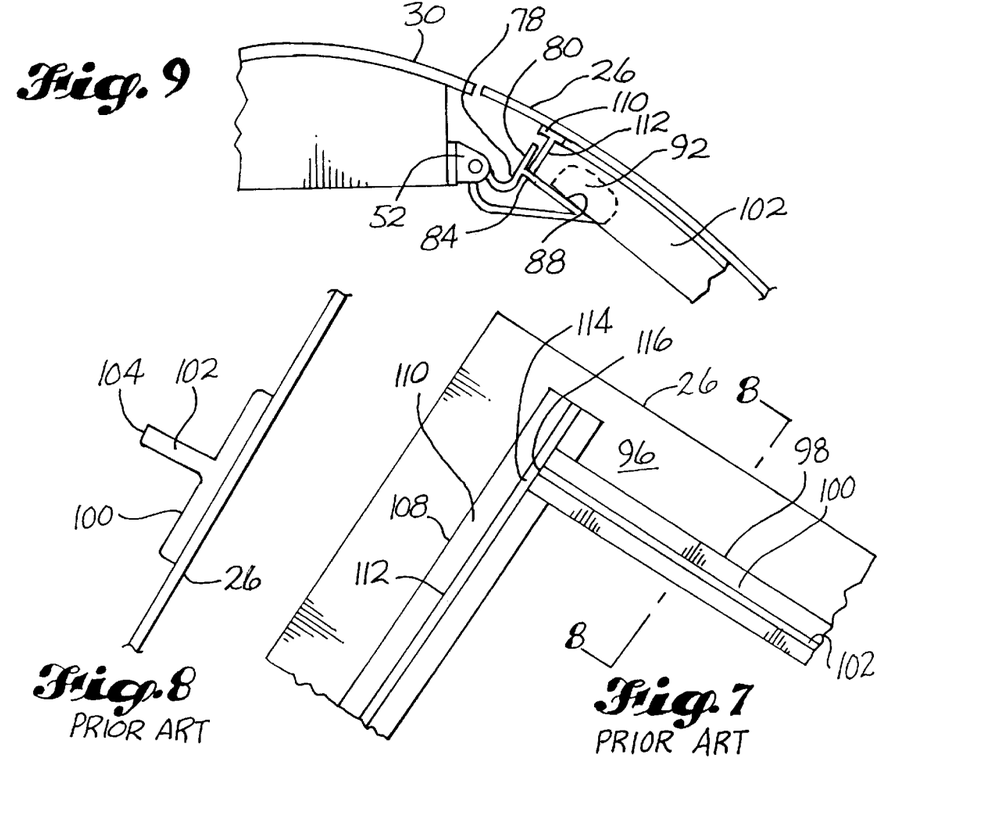
FIG. 7 is a partial plan view of an inside portion of the fan cowl panel.
FIG. 8 is a cross-sectional view taken along line 8—8 of FIG. 7.
FIG. 9 is a partial cross-sectional view showing the attachment of the fan cowl panel to an exemplary hinge of the present invention.

In order to describe the manner in which the longeron attachment fitting 78 and leg attachment fitting 86 connect to the fan cowl 26, reference is now made to FIGS. 7 and 8 which show conventional components of the fan cowl 26. There is shown a skin portion 96 of the panel 26 having attached to its inside surface an elongated leg fitting 98 (only a portion of which is shown) which has an inverted T-shaped cross section defined by a horizontal base 100 which is fastened to the inside of the skin 96 and which supports an upstanding wall segment 102 which runs the length of the base 102 and which terminates in the vertical direction at an upper edge 104.

Furthermore, mounted perpendicular to the leg 98 is a longeron fitting 108 (only a portion of which is shown) which has an inverted T-shaped cross section defined by a horizontal base 110 which is fastened to the skin 96 and which supports an upstanding wall segment 112 terminating in the vertical direction at an upper edge 114. As shown in FIG. 7, the leg fitting 98 and the longeron 108 terminate at a common corner 116.

As shown in FIG. 9, attachment of the fan cowl panel 26 to the hinge arm 56 is accomplished by positioning the wall segment 102 of the leg fitting 98 adjacent to the wall segment 92 of the hinge arm 56 and joining them together by conventional fasteners (not shown) such that the upper edge 104 of the leg wall segment 102 is adjacent to the upper surface of the leg attachment floor 88. In addition, attachment of the fan cowl panel 26 to the hinge arm 56 is accomplish by positioning the longeron wall segment 112 adjacent to the wall segment 80 of the longeron attachment fitting 78 and joining them together by fasteners (not shown) such that the upper edge 114 of the longeron wall segment 112 is adjacent to an upper surface of the floor 84 to the longeron attachment fitting 78.

During movement of the fan cowl panel 26 from the fully open position shown in FIG. 2 to the closed position shown in FIG. 1, the panel 26 is guided to a centered position in a novel manner so that the V-blade 38 (FIG. 4) is aligned with the V-groove 40. This is accomplished by the interaction of the mounting assembly indicated at 52 in FIG. 10 with the pivot connector assembly indicated at 70 in the manner to be discussed below.

Figure 10:
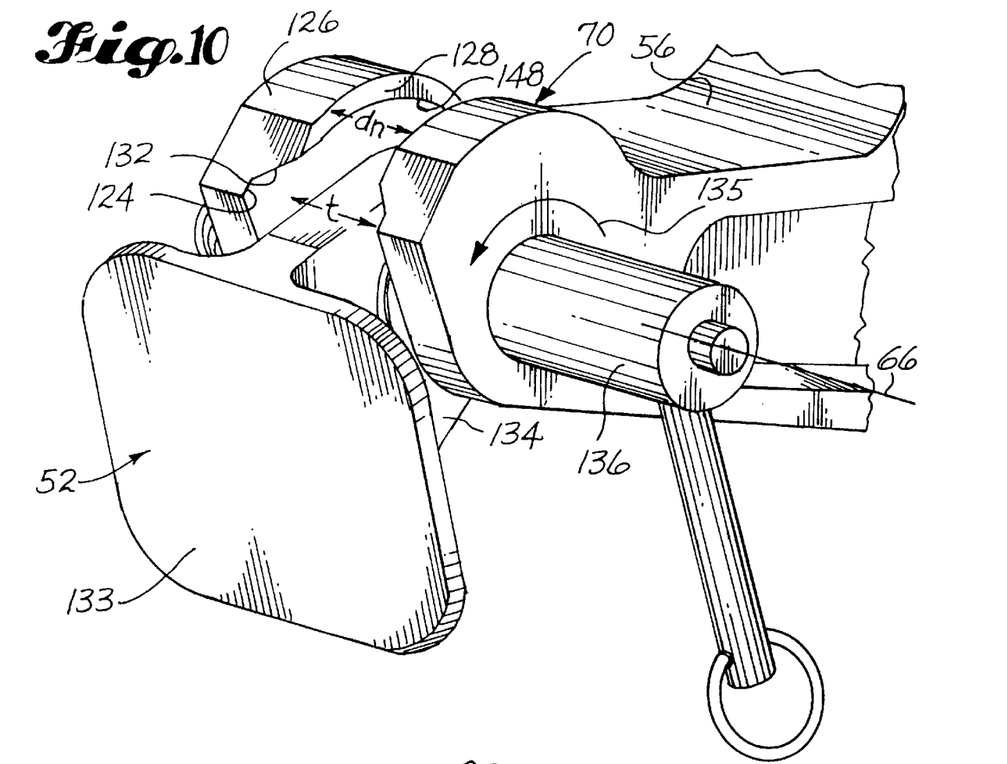
FIG. 10 is an isometric view of a portion of the exemplary hinge in a closed position.
Figure 11:
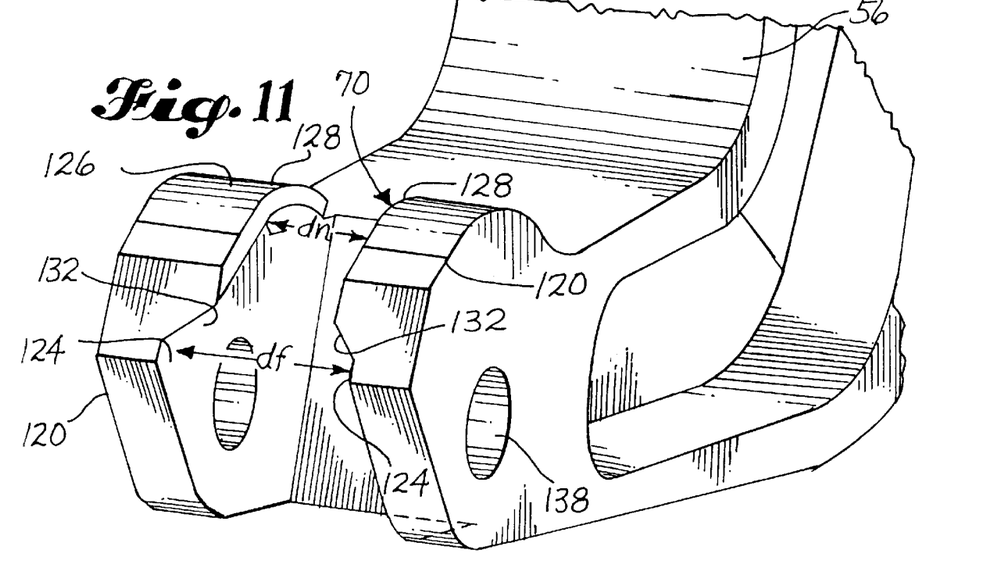
FIG. 11 is an isometric view of a portion of the exemplary hinge without a mounting assembly.

Referring now to FIG. 11 there is shown the pivot connector assembly 70 which includes a clevis fitting comprised of a pair of opposing spaced apart end walls 120. The clevis end walls 120 include opposing parallel, inner "far" surfaces 124 which are spaced apart a distance designated by the letters "$d_f$" in FIG. 11. The purpose of the wide surfaces 124 is to allow freedom for axial movement of the fan cowl panel 26 relative to the hinge 50 along the hinge line 66 (FIG. 10).

The clevis end walls 120 also include a pair of arcuate shaped upper collars 126 which have their outer end faces attached to the far surfaces 124 and which include at their inner end faces opposing parallel, flat "near" centering surfaces 128 which are spaced apart a distance, designated by the letters "$d_n$" in FIG. 11, which is less than the distance "$d_f$". The purpose of the centering surfaces 128 is to hold the fan cowl panel 26 in centered alignment in a manner to be discussed later.

Connecting the centering surfaces 128 with the far surfaces 124 are a pair of opposing intermediate surfaces 132 which taper towards each other in an upward direction beginning at the point where they connect with the far surfaces 124 and terminating where they connect with the respective centering surfaces 128.

As shown in FIG. 10, the mounting assembly 52 has a T-shaped cross section including a flat mounting plate 133 which is fastened to the strut 30 in the manner shown in FIG. 5, and an upstanding thin flat centering lug 134 which is located between the opposing surfaces 124 of the clevis end members 120 and which has a U-shaped perimeter. The centering lug 134 has a thickness dimension "t" (FIG. 10) which is less than the distance $d_f$ (FIG. 11) so as to permit fore and aft movement of the centering lug 134 along the pivot axis 66 between the far surfaces 124. This corresponds to the closed position of the panel 26 where fore and aft movement of the panel along the pivot axis 66 (hinge line) is desirable as explained earlier. On the other hand, thickness dimension t is only slightly smaller than distance $d_n$ between the centering surfaces 128 so as to allow movement of the clevis end walls 120 relative to the centering lug 134 about pivot axis 66, but to prevent axial movement of the of the clevis end walls 120 centering lug 134 along the pivot axis 66.

Figure 12:
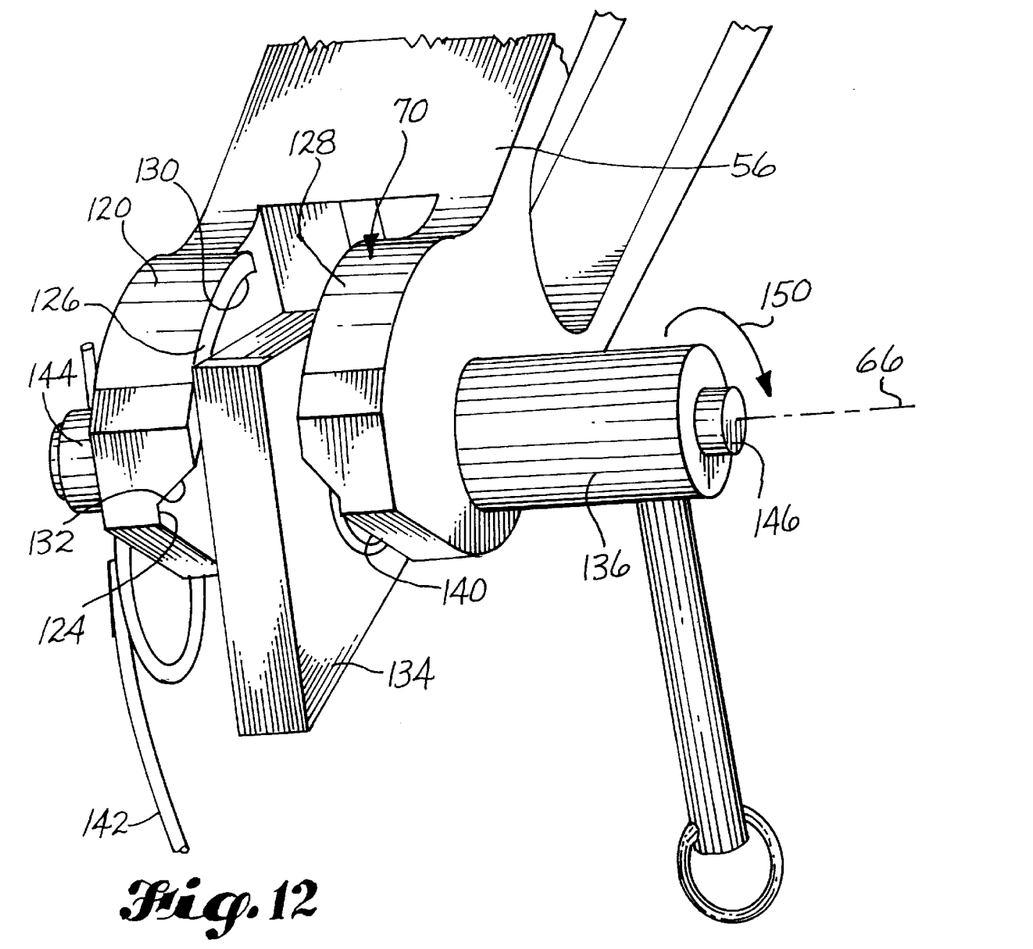
FIG. 12 is an isometric view of a portion of the exemplary hinge without a mounting plate and in an open position.

Referring to FIG. 10, counterclockwise movement of the arm 56 in the direction shown by an arrow identified by the number 135, first causes the intermediate surfaces 132 of the clevis end walls 120 to be guided between the centering lug 134. Further rotation of arm 56 is followed by the centering surfaces 126 being positioned between the centering lug 134 as shown in FIG. 12 (which shows the mounting assembly 52 without the mounting plate 133). During most open positions of the fan cowl 26, the centering surfaces 126 are positioned on either side of the centering lug 134 to prevent axial movement of the fan cowl panel along the pivot axis 66.

Pivotal connection between the centering lug 134 and the clevis end members 120 is accomplished by a pin 136 (FIG. 10) which extends through opposing openings 138 (FIG. 11) of the end members 120 and through an opening 140 (FIG. 12) in the center of the centering lug 134. The pin 136 is a conventional four ball quick release pin with the addition of a spring clip 142 through the end of the pin body 144. When the spring clip 142 is installed, it assures that a lock shaft 146 is fully retracted thereby ensuring that the pin 136 is fully installed in the hinge and preventing it from being accidentally extracted.

Centering operation of the hinge is best described by reference to FIGS. 10 and 12. When the arm 56 is in the position shown in FIG. 10, the outside U-shaped surface of the centering lug 134 is located inside of inside surfaces 148 of the clevis collars 128 thus permitting axial movement of the clevis end members 120 (and arm 56 therewith) along the pivot line 66 of the fan cowl panel between the far surfaces 124. This is the position of the centering tang 134 relative to the centering surfaces 126 when the fan cowl 26 is fully closed.

During closing of the fan cowl 26 from the open position where the clevis end members are located on opposite sides of the centering lug 134 as shown in FIG. 12, the hinge arm 56 moves in a clockwise direction shown by an arrow identified by the number 150 which causes the clevis centering surfaces 126 to rotate upward followed by intermediate surfaces 132. Continued movement of the fan cowl panel to the closed position causes further counterclockwise rotation of the hinge arm 56 until the far surfaces 124 are positioned at opposite sides of the centering lug 134 as the panel 26 reaches the closed position. In this manner, the fan cowl panel 26 remains aligned throughout the closing operation until nearing the fully closed position where the clevis end members 120 are free to move along the pin 136 between the far surfaces 124 as discussed earlier.

What is claimed is:

1. A hinge assembly supporting a workpiece from a support member in a manner relative to a reference member, the hinge assembly comprising:

a. means, connected to the support member, for supporting the workpiece in a manner to allow pivotal movement of the workpiece about a pivot axis between a first position and a second position such that when the workpiece is in the first position the workpiece is allowed to move in an axial direction relative to the pivot axis and when the workpiece is in the second position the workpiece is not allowed to move in the axial direction; and b. means, attached to the workpiece supporting means, for aligning the workpiece with the reference member during movement of the workpiece from the second position.

2. The hinge assembly as set forth in claim 1 wherein:

a. the workpiece supporting means includes an arm which is attached to the workpiece; and b. the workpiece aligning means includes (1) guide means, and (2) means for engaging the guide means at a first location of the workpiece aligning means to prevent axial movement of the arm along the pivot axis so as to align the workpiece with the reference member, and (3) means for engaging the guide means at a second location of the workpiece aligning means to allow axial movement of the arm along the pivot axis.

3. The hinge assembly as set forth in claim 2 wherein:

a. the workpiece is a panel member;

b. the reference member has an opening;

c. the first position is a closed position relative to the opening; and d. the second position is an open position relative to the opening.

4. The hinge assembly as set forth in claim 3 wherein:

a. the guide means engaging means is a clevis having first and second guide walls; and b. the guide means is a guide fitting which is located between the first and second guide walls and which aligns the panel member with the reference opening during movement of the panel member from the open position.

\* \* \* \* \*